US005617137A

United States Patent [19]
Whitlow

[11] Patent Number: 5,617,137
[45] Date of Patent: Apr. 1, 1997

[54] IN-SERVICE MEASUREMENT OF COMPOSITE TRIPLE BEATS IN A CABLE TELEVISION SYSTEM

[75] Inventor: Dana E. Whitlow, Aloha, Oreg.

[73] Assignee: Tektronix, Inc., Wilsonville, Oreg.

[21] Appl. No.: 452,782

[22] Filed: May 30, 1995

[51] Int. Cl.$^6$ .......................... H04N 17/00; H04N 17/02
[52] U.S. Cl. .......................... 348/193; 348/192
[58] Field of Search .......................... 348/6, 180, 181, 348/183, 192, 193; 455/3.1, 6.1; H04N 17/00, 17/02

[56] References Cited

U.S. PATENT DOCUMENTS

| 5,073,822 | 12/1991 | Gumm et al. | 358/139 |
|---|---|---|---|
| 5,323,239 | 6/1994 | Ward et al. | 348/607 |
| 5,493,209 | 2/1996 | Gumm et al. | 348/180 |

OTHER PUBLICATIONS

"NCTA Recommended Practices for Measurements on Cable Television Systems" Second Edition, International Standard Book No. 0-940272-17-2 (pp. 4-5).

*Primary Examiner*—John K. Peng
*Assistant Examiner*—John W. Miller
*Attorney, Agent, or Firm*—William K. Bucher; Francis I. Gray

[57] ABSTRACT

An in-service composite triple beats (CTB) measurement system for a cable television (CATV) system isolates and measures weak composite triple beat components in the presence of a visual carrier modulated with program material for selected channels of the CATV system. Each channel is demodulated and digitized in a frequency bandwidth about the visual carrier for the channel (the CTB frequency range). The digitized video is sampled during the vertical interval, and corresponding samples from consecutive frames are differenced, squared and accumulated to produce a CTB value, which may be scaled and corrected for noise. Noise correction is achieved by performing the same measurement, but digitizing in a frequency bandwidth offset from the CTB frequency range. The difference between the two measurements provides a corrected CTB value. For further accuracy the automatic gain control of the demodulator may be enabled only during the vertical interval, and the frequency control of a phase locked loop that produces the clock for the digitization of the video signal may be turned off during the vertical interval. Finally the amplitude of the sync tips of the demodulated video signal may be minimized prior to digitization.

11 Claims, 3 Drawing Sheets

IN-SERVICE MEASUREMENT OF COMPOSITE TRIPLE BEATS IN A CABLE TELEVISION SYSTEM

BACKGROUND OF THE INVENTION

The present invention relates to the measurement of system parameters in a cable television (CATV) system, and more particularly to a method and apparatus for in-service measurement of composite triple beats.

A cable television (CATV) system passes a conglomerate of typically sixty or more television signals through a common distribution system which includes active elements, such as amplifiers. These active elements are imperfect in several ways, including being somewhat non-linear. Third order terms in the nonlinearities are particularly troublesome because they tend to produce numerous, commonly several thousand, spurious signals in the immediate vicinity of each channel's visual carrier. The ensemble of all these spurious signals associated with a particular channel is known as a "composite triple beat" (CTB). The amplitude of the CTB grows very rapidly with signal levels. It is considered necessary to adjust the signal levels so that the CrB's root-mean-square (RMS) amplitude is at least 51 decibels (dB) below the visual carrier's peak envelope amplitude pursuant to Federal Communications Commission (FCC) regulations.

Another major adverse factor in CATV systems is the buildup of noise. As one looks further and further out in the distribution system from the headend, the total noise amplitude increases because of additive contributions from each amplifier along the chain.

Thus in a CATV system there is a tradeoff in setting operating signal levels. Too high a signal level results in an excessive CTB level, which causes crawling, flickering, horizontal bands, etc. in the picture. Too low a signal level results in poor signal-to-noise (S/N) ratio, which causes a snowy picture. The acceptable amplitude range becomes very narrow in large systems, and CATV engineers tend to become preoccupied with measurements of CTB and noise levels in their distribution system. Their concerns arise partly out of the need to determine the best operating signal level and partly from the need to document compliance with statutory limits on signal defects.

Individual components of each CTB are due to the mixing of various combinations of three different signals. Given the channel frequency arrangement and allowable frequency errors, it turns out that most of the CTB energy on a given channel is contained in a band about 30 KHz wide centered within 15 KHz of the visual carrier. There are also potentially significant CTBs in similar bands at 2.5 MHz above and 2.5 MHz below the visual carrier. However these CTBs are generally weaker and are less bothersome to the viewer due to their large offset from the visual carrier, although there may be some correlation between these CTBs and the CTB about the visual carrier.

In principle the measurement of CTB amplitude is straightforward: just shut down the carrier of the channel of concern and measure the CTB amplitude with a spectrum analyzer, using a resolution bandwidth (BW) sufficient to encompass the entire CTB, usually 30 KHz. Then restore the carrier, measure its amplitude and calculate the ratio of the two measured values. Unfortunately there are some major difficulties with this approach:

CATV subscribers are not amused when their signal disappears for any reason.

Current Federal Communications Commission (FCC) regulations require that the CTB level be measured at the output of the set top converter commonly used by subscribers. If the carrier of the channel under test is simply shut down, the automatic gain control (AGC) of the converter drastically increases the converter's gain, so that there is now considerable difficulty in accurately comparing the CTB amplitude to that of the visual carrier that normally exists.

Most converters currently in use work by demodulating the selected channel to baseband video, then eventually remodulating the video back onto a fixed frequency radio frequency (RF) carrier. In the absence of a suitable carrier at its input, the response of the converter to an essentially noise-like signal is such that CTB energy becomes ill defined at best.

In view of these difficulties it becomes very desirable to have a means of measuring the amplitude of the CTB in the presence of the normal television signals.

The National Cable Television Association (NCTA) has published recommended practices for measurements on cable television systems. One of the recommended methods from the October 1993 revision, incorporated herein by reference, for measuring the CTB eliminates the need to remove the carrier and uses a spectrum analyzer as a fixed tuned receiver, but it does require removing the modulation on the carrier. This method is helpful if communications with the headend are not available or the carrier is not easily controllable. The CTB appears as an amplitude modulated (AM) component on a continuous wave (CW) carrier, and by comparing this AM component with the carrier level, the CTB is measured. However on some types of CATV systems the CTB appears as a CW signal and is not measurable with this method. Also hum and cross modulation appear as AM components, and are thus indistinguishable from the CTB using this method,.

A method of in-service cable television measurements is disclosed in U.S. Pat. No. 5,073,822 issued Dec. 17, 1991 to Linley F. Gumm, incorporated herein by reference. This technique uses a modified spectrum analyzer for determining both carrier-to-noise and CTB ratios. The modified spectrum analyzer is triggered for single sweep during the vertical interval of a selected channel and the noise amplitude, peak sync tip amplitude and frequency of the channel are determined. For CTB measurements a special headend unit is coupled between a television signal source and a combiner prior to distribution to offset a selected channel by a predetermined frequency for a specified number of lines in the vertical interval. The peak sync tip amplitude and CTB amplitude are measured by the modified spectrum analyzer during the specified number of lines. The CTB ratio is determined from the CTB amplitude and the peak sync tip amplitude and displayed. This technique requires a special unit at the headend as well as communication with the headend.

What is desired is an in-service measurement of composite triple beat in a cable television system that is accurate and may be performed at a set top converter without the requirement of communication with the headend or of special headend equipment.

SUMMARY OF THE INVENTION

Accordingly the present invention provides an in-service measurement of composite triple beat (CTB) for a cable television system that isolates the weak CTB disturbance from legitimate picture signals on a visual carrier. A baseband video signal from a channel under test is obtained using a video demodulator which includes automatic gain control (AGC) so that constant amplitude video is produced. The baseband video signal is lowpass filtered. During each video frame several selected lines of the baseband video signal during the vertical retrace interval are sampled and digitized at a rate that is some integer multiple of the horizontal sweep rate, with a constant timing relationship to the horizontal sweep. The samples from each frame are stored in memory to form a sample ensemble. The sample ensemble varies slightly from frame to frame in the presence of CTB, noise, etc. Differences are found by subtracting samples of the current frame from corresponding samples from the previous frame. A time averaged power value is accumulated, scaled and reported as the CTB level relative to visual carrier, subject to later correction for non-CTB noise riding on the video signal.

The objects, advantages and novel features of the present invention are apparent from the following detailed description when read in conjunction with the appended claim and attached drawing.

DESCRIPTION OF THE PREFERRED EMBODIMENT

Figure 1:
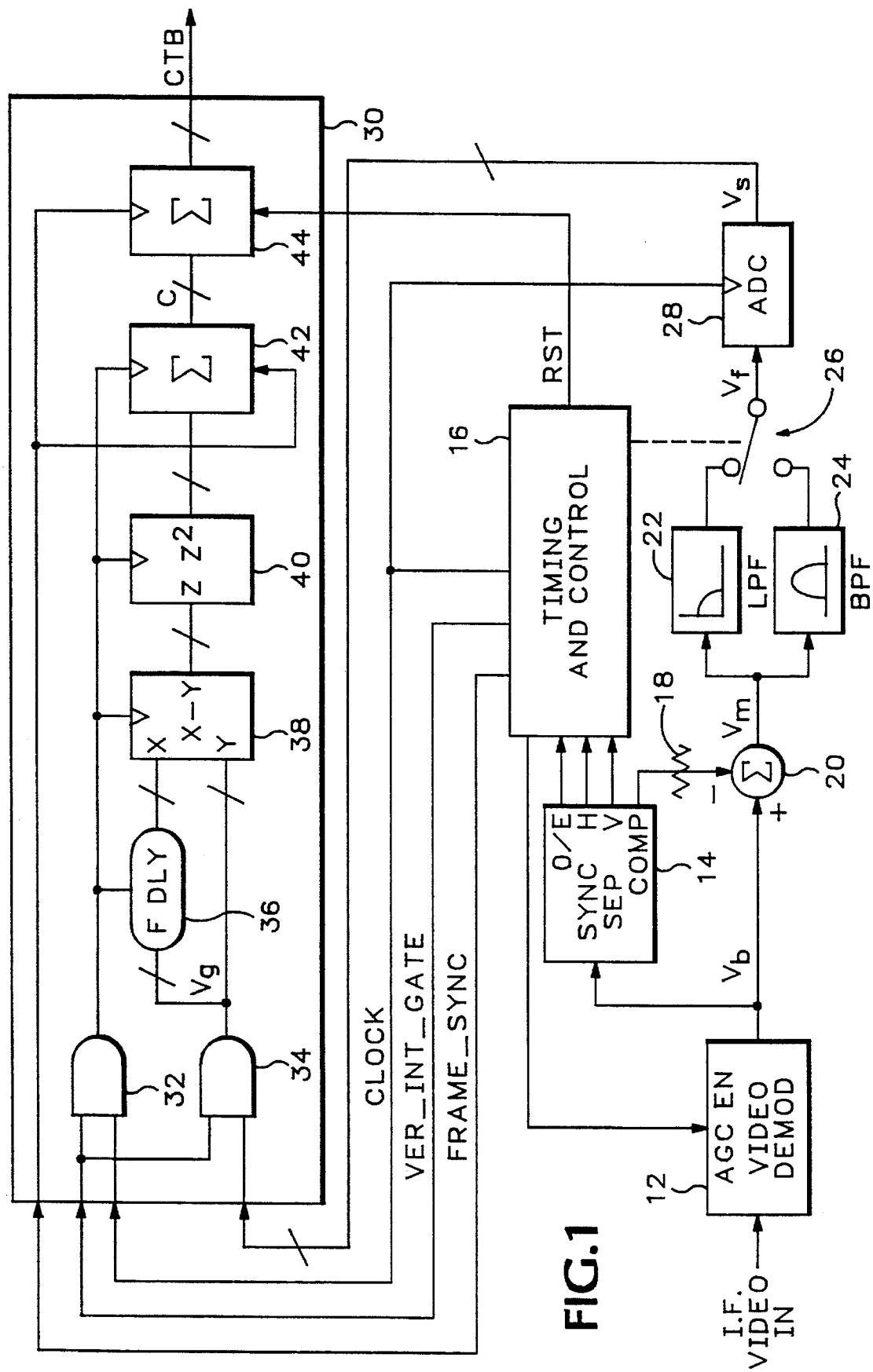
FIG. 1 is a block diagram view of a system for in-service measurement of composite triple beats in a cable television system according to the present invention.
Figure 2:
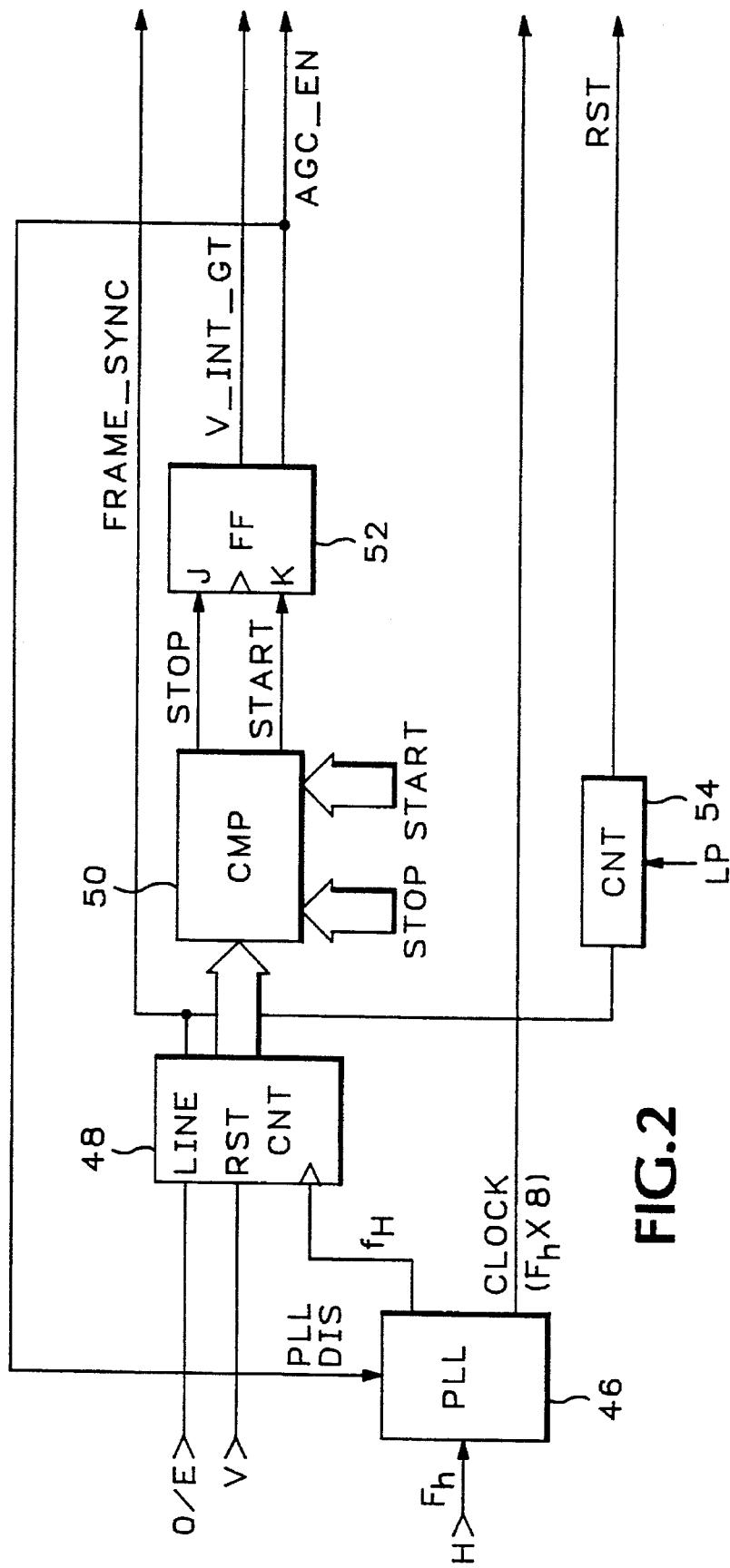
FIG. 2 is a block diagram view of a timing and control circuit for the system of FIG. 1 according to the present invention.

Referring now to FIG. 1 a selected cable television (CATV) system channel of video is output from an intermediate frequency (IF) output of a spectrum analyzer (not shown) and input to a video demodulator 12 to produce a baseband video signal Vb. The baseband video signal is input to a sync separator 14 to obtain various timing signals, such as a field odd/even signal (O/E), a horizontal sync signal (H), a vertical sync signal (V) and a composite sync signal (COMP). The O/E, H and V timing signals are input to a timing and control circuit 16 to produce further timing and clock signals, as is discussed below. The COMP signal is input via an attenuator 18 to a combining circuit 20 to which also is input the baseband video signal. The composite sync signal is subtracted from the baseband video signal in the combining circuit 20 to produce a modified video signal Vm.

The modified video signal is input to a pair of filters, a lowpass filter 22 and a bandpass filter 24. The outputs from the filters 22, 24 are input to a switch 26. The switch 26 may be controlled by the timing and control circuit 16 or may be manually controlled. The filtered video signal Vf from the switch 26 is input to a digitizer circuit 28 which is clocked by a sample clock signal (CLOCK) from the timing and control circuit 16. The sampled and digitized video signal Vs is input to a digital processing circuit 30 together with the sample clock signal, a vertical interval gate signal (VER_INT_GATE) and a frame sync signal (FRAME_SYNC) from the timing and control circuit 16. The digital processing circuit 30 outputs a CTB value that may be scaled to produce a final CTB report for display.

The digital processing circuit 30 may be implemented by a microprocessor, by a programmable logic array or by discrete circuitry as shown. The vertical interval gate signal is input to a pair of AND gates 34, one of which also has the sample clock signal as an input and the other of which has the sampled video signal as an input. The gated sampled video signal Vg is input to a one-frame delay circuit 36 and to a differencing circuit 38. The output from the one-frame delay circuit 36 is also input to the differencing circuit 38. The output from the differencing circuit 38 is input to a squaring circuit 40, the output of which is input to a frame accumulator 42. The output from the frame accumulator 42 is input to a CTB accumulator 44, the output of which is an accumulation of values over several frames that is related to the CTB amplitude. The CTB output may be scaled by a lookup table, microprocessor or the like (not shown) to produce a CTB report for display.

This digital processing is equivalent to passing a band limited and gated video signal through a comb filter composed of two parallel paths: a prompt path and a one-frame delayed and inverted path. The outputs from the two paths are summed with equal weight to form the filter output. Such a filter has a sinusoidal frequency response, with a zero response at DC and integer multiples of the frame rate and a maximum magnitude response at odd integer multiples of one-half the frame rate. Thus the measurement is insensitive to energy at exact integer multiples of the frame rate with a finite response to energy at other frequencies. Therefore energy due to sync pulses in the vertical interval is rejected In the usual television demodulator the amplitude at each horizontal sync tip is sampled and compared against a reference. The resulting error voltage is held on a capacitor between sync pulses and is used as a gain control voltage to keep the recovered sync tip amplitude constant. To provide the best protection against time varying path conditions, the response time constant of the AGC usually is made quite short, typically about a one line, or a very few lines, period. This mode of operation is not very desirable for CTB measurements because the efforts of the AGC to eliminate variations of the sync tip level severely attenuate the CTB measurement. This may be compensated for by making the AGC very slow acting, on the order of several frame periods. However given the inevitable presence of aberrations on the video signal, such as ghosts, etc., some portion of each active video line bleeds into the succeeding horizontal sync pulse so that the measurement of sync tip amplitude is corrupted somewhat by picture content. This corruption by picture content extends to the CTB measurement itself, manifesting itself as large frame error readings upon drastic scene changes. To prevent this effect the AGC may be enabled by an AGC enable signal from the timing and control circuit 16 only during the repetitive portion of the vertical sync intervals, starting at least one line after the last active video line in each frame, while leaving the AGC "on hold", or disabled, the rest of the time. This prevents the AGC system of the video demodulator 1. from being affected by picture content, and thus avoids a significant measurement error source.

The usefulness of this CTB measurement method depends on the noise-like property of the CTB being measured. If CTB were a single pure tone, its measured power could range from zero to twice the correct value depending upon the frequency of the tone relative to the comb filter response. However CTB is composed of many small amplitude components dispersed in frequency over a range of at least several dozen Hertz, so a good measurement of the overall power is possible. Thus this method is effective for CTB measurements on non-phase-locked systems where the individual channels have random carrier frequency errors of typically hundreds of Hertz up to a few KHz. There is always some residual sync information residing on the modified video signal Vm. It is therefore important to minimize timing jitter of the sampling clock in order to repeatably sample the signal with respect to the residual sync information so as to avoid creating spurious frame-to-frame variations on the sampled signal Vs. Such variations would be falsely reported as CTB. Therefore the timing and control circuit 16 disables the feedback in its internal phase locked loop during the measurement interval so that noise or other perturbations don't cause random variations in the sampling clock timing.

As shown in FIG., 2 the horizontal sync signal from the sync separator 14 is input to a phase locked loop (PLL) 46 to generate the sample clock signal and a horizontal frequency signal Fh locked to the phase locked loop. The field odd/even signal from the sync separator 14 is input to a reset input of a line counter 48. The line counter 48 is clocked by the horizontal frequency signal Fh. The outputs from the counter 48 are input to a digital comparator 50. The digital comparator compares the digital count from the counter 48 with a start and stop value to produce two outputs—an AGC_STOP signal and an AGC_START signal. The AGC_STOP and AGC_START signals are input to a J–K type flip-flop 52, the outputs of which are the vertical interval gate signal to the DSP 30 and the AGC enable signal to the video demodulator 12. The AGC enable signal also acts as a PLL disable signal that is input to the PLL 46 to disable the PLL during measurement.

Also because the arrangement of equalizing pulses alternates between odd and even fields, using blocks from both fields could result in large undeserved frame error values. Therefore CTB samples generally are acquired in only one block per frame. However by using a suitable interleaving technique, samples from all fields may be used which provides for a faster measurement averaging.

Since it is desirable to measure CTB levels as low as about −70 dBc, a precise analog-to-digital converter, such as an 11 or 12 bit converter might be used as the digital converter 28. Such a converter with sufficient speed is very costly. The ideal video signal during the vertical sync interval is identical to the digital composite sync signal from the sync separator circuit 14. The sync separator circuit 14 acts as an amplitude limiter and so removes the effects of CTB from its output. The composite sync signal output from the sync separator circuit 14 is inverted, scaled and summed with the baseband video signal prior to the filters 22, 24 by summation circuit 20. This results in reducing the sync signal amplitude by a factor of about ten during the measurement interval. But small disturbances like CTB are not present in the composite sync signal and so are not cancelled. Therefore since the measurement range is reduced considerably, a less precise analog-to-digital converter 24 may be used, such as an 8-bit converter, to accomplish the same overall measurement.

The ultimate sensitivity of any CTB measurement is limited by the amplitude of the regular broadband video noise falling within the CTB measurement bandwidth on the channel under test. Therefore a second measurement similar to the CTB measurement is made using the bandpass filter 24 rather than the lowpass filter 22 by switching the switch 26 output to the bandpass filter. The bandwidth of the bandpass filter 24 is chosen to be roughly comparable to that of the lowpass filter 22 so that roughly similar signal levels may be expected, and its center frequency is chosen to be high enough, typically about 100 KHz, to exclude CTB products. The measurement result from this second measurement is scaled to account for bandwidth and gain differences, and correction of the CTB result is done in the usual manner of dealing with noise floor proximity, using for example a microprocessor, programmable array or the like. The CTB corrected for noise is the final value provided by the CTB report for display.

Figure 3:
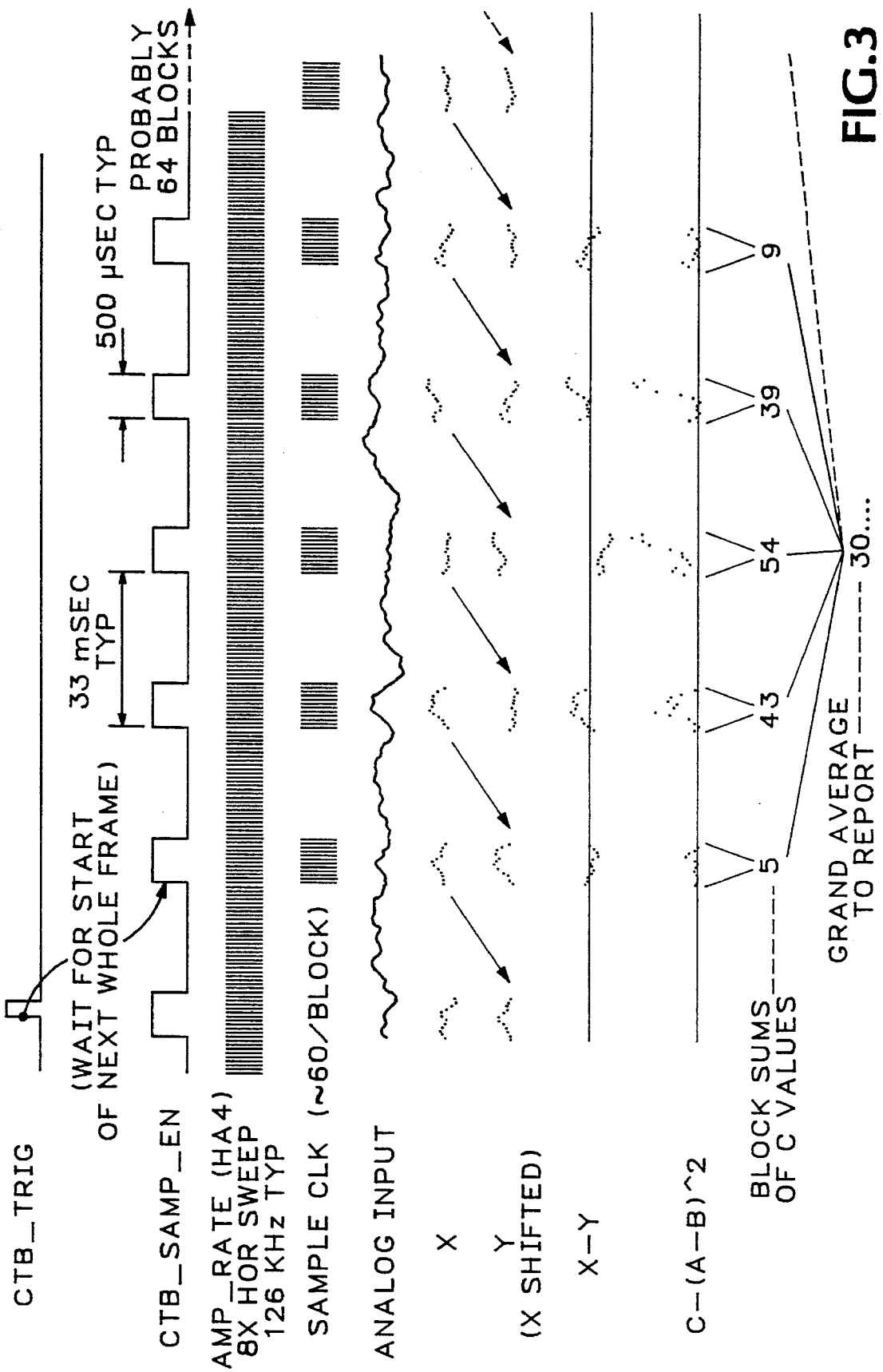
FIG. 3 is a timing diagram view illustrating the operation of the system of FIG. 1 according to the present invention.

In operation as shown in FIG. 3 when a CTB measurement is triggered by an appropriate trigger signal (CTB_TRIG), the timing and control circuit 16 generates a CTB sample enable pulse from the vertical and horizontal sync signals and the odd/even field signal from the sync separator 14 with a duration of approximately eight lines during the vertical interval, i.e., starting at least one line after the last line of active video from the prior frame. The CTB sample enable pulse defines a sample block within the video frame, and is combined with a sample rate clock generated by the timing and control circuit 16 in synchronization with the sync signals from the sync separator 14 to select the samples from the digitizer 28 for processing by the DSP 30. The filtered video from the switch 26 is sampled by the digitizer 28, approximately 60 samples per sample block to produce the data input for the DSP 30. For each subsequent frame, additional blocks of sampled video data are obtained. The prompt video signal data at input Y of the subtractor circuit 38 and the delayed video signal data from the frame delay circuit 36 at input X (Y delayed data) of the subtractor circuit produce the difference output Z, which is then squared by the squaring circuit 40 to produce Z^2. The Z^2 results are accumulated for each frame by the frame accumulator 42 to produce a series of C values, which in turn are averaged over many frames, such as 64 frames, to produce the CTB output from the CTB accumulator 44.

Thus the present invention provides an in-service measurement of composite triple beats in a cable television system by taking advantage of the different spectral properties of a video synchronizing signal and CTB energy to isolate and measure weak CTB signals.

What is claimed is:

1. A method of in-service measuring composite triple beats in a cable television system comprising the steps of:

demodulating a selected channel from the cable television system having a visual carrier to produce a baseband video signal;

for each frame of the baseband video signal sampling the baseband video signal during a specified measurement interval in a frequency bandwidth about the visual carrier;

time averaging the squares of the differences between samples from consecutive frames of the baseband video signal to obtain a measure of the composite triple beats for the selected channel as a triple beat value.

2. The method as recited in claim 1 further comprising the step of minimizing sync peaks in the baseband video signal prior to the sampling step.

3. The method as recited in claim 1 further comprising the step of enabling automatic gain control of the selected channel only during the specified measurement interval.

4. The method as recited in claim 1 further comprising the step of disabling a phase locked loop's feedback from which a jitter free sampling clock for the sampling step is generated during the specified measurement interval.

5. The method as recited in claim 1 further comprising the steps of:

repeating the sampling and time averaging of the baseband video signal in a frequency bandwidth offset from frequency bandwidth about the visual carrier during the specified measurement interval to obtain a measure of a noise floor for the selected channel to produce a noise value; and combining the noise value and the triple beat value to obtain a corrected measure for the composite triple beats for the selected channel.

6. An apparatus for in-service measuring of composite triple beats in a cable television system comprising:

means for demodulating a selected channel from the cable television system, the selected channel having a visual carrier, to produce a baseband video signal;

means for sampling each frame of the baseband video signal in a frequency bandwidth about the frequency carrier during a specified measurement interval to produce a sampled video signal; and means for time averaging the squares of differences between corresponding samples from consecutive frames of the sampled video signal to obtain an output value that is a measure of the composite triple beats for the selected channel.

7. The apparatus as recited in claim 6 wherein the sampling means comprises:

means for generating timing signals from the baseband video signal;

means for filtering the baseband video signal in a frequency bandwidth about the visual carrier to produce a filtered video signal; and means for digitizing the filtered video signal to produce the sampled video signal.

8. The apparatus as recited in claim 7 wherein the sampling means further comprises means for minimizing the amplitude of sync pulses in the baseband video signal to produce a modified video signal for input to the filtering means.

9. The apparatus as recited in claim 7 wherein the generating means comprises means for providing a gain control signal for input to the demodulating means to enable automatic gain control in the demodulating means only during the measurement interval.

10. The apparatus as recited in claim 7 wherein the generating means comprises means for disabling frequency control for a phase locked loop that provides a sampling clock for the digitizing means during the measurement interval.

11. The apparatus as recited in claim 6 wherein the time averaging means comprises:

means for obtaining the differences between corresponding samples of consecutive frames of the sampled video signal during the measurement interval;

means for squaring the differences to produce squared values; and means for accumulating the squared values over each frame for a specified number of frames to produce the output value for composite triple beats.

* * * * *